Aug. 3, 1965   E. L. CLARKE   3,198,261
IMPLEMENT DRAFT AND POSITION CONTROL FOR TRACTORS
Filed Feb. 27, 1963   2 Sheets-Sheet 2

INVENTOR.
EVANS L. CLARKE.
BY
Emerson B Donnell
Attorney

United States Patent Office 3,198,261
Patented Aug. 3, 1965

3,198,261
IMPLEMENT DRAFT AND POSITION CONTROL
FOR TRACTORS
Evans Lipton Clarke, Sherrard, Ill., assignor to J. I. Case Company, Racine, Wis., a corporation of Wisconsin
Filed Feb. 27, 1963, Ser. No. 261,391
4 Claims. (Cl. 172—9)

The present invention relates to implement controls, and an object thereof is to generally improve the construction and operation of devices of this class. In tractors used with earth working implements, it is desirable to have (under some conditions) means for adjusting, as a function of the draft force required to pull the implement, the depth at which the implements will work. Such an arrangement makes it easier for the tractor operator, saves fuel, accomplishes more work in a given time, and saves wear and tear on the tractor and implement. This is particularly true where there is great variation in the texture and hardness of the soil, so that the tractor could pull the implement most of the time at a greater depth than it could, say in a few parts of the field. Under these conditions, it would be desirable to set the depth of the implement, and have it remain at such depth, except in those regions where the soil is of such texture that it would overload the tractor, and to have the implement automatically raised when this occurs so that the tractor would not stall, and the work could continue. A supplemental benefit is derived from this action, in that the act of raising the implement imparts a downward reaction force to the rear wheels of the tractor to help prevent them from slipping during the overload period.

An object of the invention is to devise an improved arrangement for automatically adjusting the working depth of an implement in accordance with the draft reaction thereof, known in the art as "draft control."

There are other conditions wherein it is undesirable to have the implement controlled in such manner, and to allow the implement to seek and find its own depth. Under these conditions, the device used for sensing the draft reaction might be subjected to extreme loads since the implement would not, under these conditions, be raised in response to overloads. It is, therefore, desirable, and a device has been provided, to withstand extreme loads under these conditions and to thereby shield the sensing means from damage.

Furthermore, certain types of implements are better controlled by positioning them definitely in relation to the tractor, and when such implements are in use, it is desirable to disable the sensing mechanism and provide only control of the position of the implement, known in the art as "position control."

Accordingly, further objects of the invention are to provide a device which shields the sensing mechanism from extreme loads when desirable; a device wherein the load sensitive feature may be disabled when desired, and also to provide a device which may readily be applied to an existing tractor, and when so applied will provide draft sensitive depth control on a previously manufactured tractor of known type.

Other objects and advantages will become apparent from the following specification and annexed drawings, in which.

Figure 1:
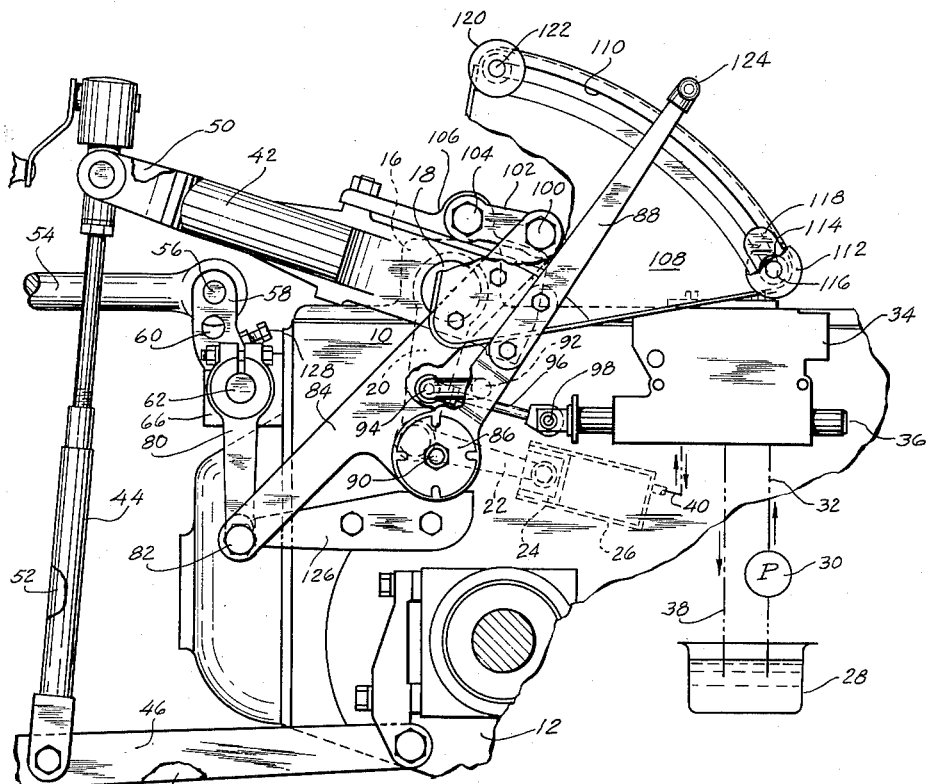
FIG. 1 is a right side elevation of so much of a tractor as is necessary to illustrate the invention, with parts removed, parts shown diagrammatically, and others broken away to show what lies beneath.

Similar reference characters have been applied to the same parts wherever they occur throughout the drawings and specification, which illustrate and describe a preferred embodiment; but it is to be understood that the invention is not to be taken as limited to what is shown and described, except as defined by the claims.

Figure 2:
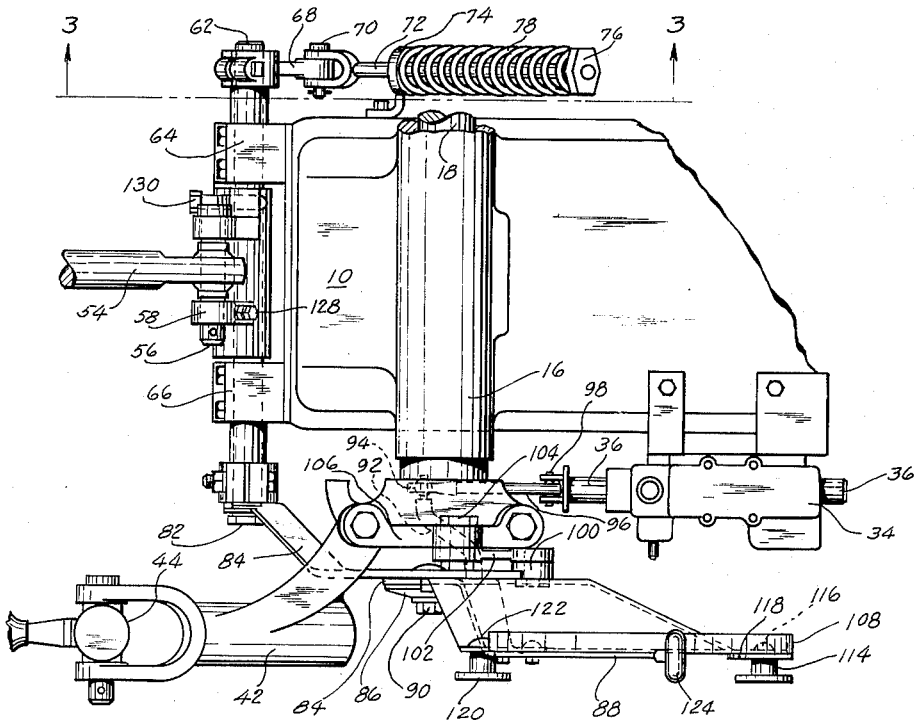
FIG. 2 is a fragmentary plan view of the same.

Turning to FIGS. 1 and 2, the rear portion of the transmission housing of a typical tractor is indicated at 10, and which has the usual axle housing 12, and a rockshaft housing 16 which constitutes part of a lifting mechanism for implements attached to the tractor. Housing 16 carries in suitable bearings, not shown, the rockshaft 18 which has, within transmission housing 10, a crank 20 to which is pivoted a pitman 22, pivoted to a piston 24, which is reciprocable in a cylinder 26, supported in any suitable manner within housing 10. Fluid is drawn from a reservoir 28, by a pump 30 and transmitted by means of a conduit 32 to a valve generally designated as 34, which may be of suitable or well-known type, and which has a reciprocable plunger 36. Normally fluid coming from pump 30 is by-passed within valve 34 and returned through a conduit 38 to reservoir 28. However, a change of position of plunger 36 to the left in FIG. 1 will shut off conduit 38, whereupon pressure fluid will flow through a conduit 40 to cylinder 26, actuating piston 24 and rocking the shaft 18 in a clockwise direction. An arm 42 fixed in relation to shaft 18 will also be rotated in a clockwise direction and, through a link connection 44, will raise a link 46 constituting part of a well-known three-point hitch construction to which an implement is attached in well-known manner. If plunger 36 is reciprocated in the other direction, it will reopen conduit 38 and also open conduit 40 to conduit 38, and allow the weight of the implement on link 46 to rock arm 42 in a counterclockwise direction, pressing piston 24 into cylinder 26 and expelling pressure fluid through conduit 40, and ultimately to reservoir 28. When plunger 36 is allowed to take a middle or neutral position, fluid is by-passed from conduit 32 through conduit 38 back to reservoir 28, while fluid trapped in cylinder 26 is retained so as to prevent counterclockwise rotation of shaft 18, and thereby maintain an implement attached to link 46 in whatever position it happens to be.

As is well known, a tractor of the type indicated will have a companion link 48 on the other side, and arm 42 will have a companion arm 50 which, through a similar link 52, controls link 48.

As common in three-point hitches, the implement is connected by means of an upper link 54 to an upper portion of the tractor and through the action of the resulting geometric figure, swings up and down about a virtual hitch point which is removed from any of the actual hitch points on the tractor. This characteristic of the device forms no part of the present invention, except that one of the characteristics of this type of implement is utilized in the depth regulation, as will appear.

The present device is perhaps best adapted to implements such as plows which have a strong overturning tendency when operating, so as to impose a strong pull or tension on links 46 and 48, while subjecting upper link 54 to a strong compression force or pressure toward the right in FIG. 1. This compression force is a function of the draft reaction or retarding force caused by the resistance of the ground to progress of the implement, and this pressure is utilized in automatically determining the depth setting of the implement.

Link 54 is connected by means of a pivotal connection 56 to a short lever 58, lever 58 having a hole 60 in which pin 56 may be engaged to give a shorter lever arm for certain conditions.

Figure 3:
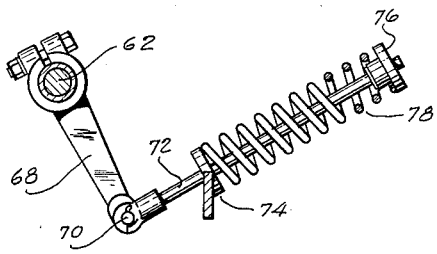
FIG. 3 is a vertical sectional elevation of a portion of the tractor on the line 3—3 of FIG. 2, showing a spring arrangement.

Lever 58 is bifurcated and fixed on a shaft 62 carried in suitable bearings 64 and 66 on the back of housing 10. Shaft 62 has a downwardly and forwardly extending arm 68, FIG. 3, fixed thereto at its leftward end. Arm 68 is pivoted at 70 to a bolt or rod 72, which passes through a lug 74 fixed in any suitable manner with the side of housing 10, and has a head or nut 76 bearing against a spring 78 which is engaged in compression between lug 74 and head 76. A forward thrust on link 54 will tend to cause clockwise rocking of shaft 62 which would rock lever 68 clockwise, as seen in FIG. 3, pulling rod 72 through lug 74 and compressing spring 78. As will be apparent, such movement will be generally in proportion to the magnitude of the compressing force in link 54, and it is this movement which is utilized in initiating action of the hydraulic mechanism, hereinbefore described, plunger 36 being connected with shaft 62 as will now be set forth.

Shaft 62, FIG. 1, has an arm 80 fixed thereon, and which is pivoted at 82 to a shiftable element or floating lever 84. Shiftable element 84 has engaged therewith through a frictional detent mechanism of well-known type 86, a hand lever 88 which is normally rigid with element 84, but which may be shifted by overcoming frictional detent 86. Frictional detent 86 includes a pivot 90 about which lever 88 is rockable on element 84.

Spaced from pivot 90, lever 88 carries a finger-like element 92, rigidly fixed thereon and which extends from the observer in FIG. 1, toward housing 10 and bends toward the rear of the tractor (to the left in FIG. 1), to a point between it and element 84. Here, it is connected by means of a suitable adjustable pivotal connection 94 with a pitman 96 which is in turn pivoted at 98 to abovementioned plunger 36.

Element 84 is pivoted at its upper end on a pivotal connection 100 to a short link 102 which is pivoted on a pivotal connection 104 to a fitting 106 fastened to abovementioned arm 42, generally above shaft 18.

Element 84 also has fixed thereto a quadrant member 108 adjacent to which above-mentioned lever 88 is slidable. Quadrant 108 in the present instance has a slot 110 in which is engaged a hand actuated nut or stop 112 having a hub portion 114 engaged with a bolt 116 which passes through slot 110. On bolt 116 is a relatively thin plate 118 which, however, is thick enough to act as a stop for lever 88. By loosening nut 112, the assemblage may be shifted along slot 110, and locked in any desired position to act as a stop for lever 88 to determine a set depth of operation of the implement, as will appear. A similar stop nut 120 is threaded on a bolt 122 and preferably engaged in slot 110 on the upper side of lever 88 to determine an upper or raised position of an implement.

Lever 88 has a convenient handle 124 which is positioned within easy reach of an operator in the usual position on the tractor.

The operation of the device, as so far described, is as follows:

As the tractor is operated, a strong compressive force is developed in link 54, tending to rock shaft 62 clockwise, and compressing spring 78. In normal operation, spring 78 will be compressed a predetermined amount by this force and, through the connected linkage, plunger 36 of valve 34 will be held in the hereinbefore mentioned neutral position in which fluid is trapped in cylinder 26, and arms 42 and 50 are held in a predetermined position which will result in the desired depth of operation of the implement attached to links 46, 48, and 54. Assuming the implement encounters a hard spot in the soil, the force in link 54 will increase, further compressing spring 78 and rocking shaft 62 farther in a clockwise direction. Such rocking will cause generally rearward movement of pivotal connection 82 and swinging of element 84 about pivotal connection 100. Since element 84, lever 88 and finger 92 constitute a rigid system, pivotal point 94 will also be swung generally rearwardly about pivot 100. This will shift plunger 36 to the left, closing conduit 38, and directing pressure fluid through conduit 40 into cylinder 46. This will rock rockshaft 18 in a clockwise direction moving pivotal connection 104 toward the right, which of course is the opposite direction to that in which pivotal connection 82 was just moved. This latter movement will have the effect of shifting pivotal connection 94 to the right, restoring plunger 36 to the aforementioned neutral position. The rocking of rockshaft 18 will have raised links 46 and 48 through the resulting upward movement of arms 42 and 50, causing the implement to now operate at a lesser depth, whereupon the force in link 54 will be reduced to a more nearly normal value.

If now the implement encounters a soft spot or normal density of soil, the pressure in spring 78 will overcome the reduced force in link 54, rocking shaft 62 counterclockwise. Such movement will shift pivotal connection 82, generally to the right in FIG. 1, shifting pivotal point 94 to the right, and displacing plunger 36 in the direction to open conduit 40 into conduit 38. The weight and downward pull of the implement will then cause counterclockwise rocking of rockshaft 18, and leftward movement of pivotal connection 100. This will shift pivotal point 94 to the left and restore plunger 36 to neutral position to hold the implement at the new depth.

Shifting of lever 88 will of course displace pivot 94, independently of any movement of pivots 82 and 100, and will activate piston 24 through valve 34 in a direction depending upon the direction of shifting of lever 88. This shifting of plunger 36 will have the same effect as that hereinbefore disclosed, resulting in a rocking of rockshaft 18 in a direction depending upon the direction of shifting of plunger 36. In the present example, shifting of lever 88 counterclockwise will cause raising of arms 42 and 50 and the attached implement. Shifting of lever 88 clockwise will cause lowering of these parts. Slight movements of lever 88 may therefore be used for correcting the depth at which the hereinbefore described actions will take place, and therefore may be used to adjust the depth at which the implement will run under normal conditions. Moving lever 88 counterclockwise to its full extent will shift plunger 36 so far that very substantial movement of rockshaft 18 will be required to restore plunger 36 to a neutral position, and this will normally be utilized to lift the implement entirely out of the ground.

Since the weight of the implement is imposed on links 46 and 48, link 54 under these conditions becomes a tension member, and force in this direction is not resisted by spring 78. Therefore, a stop element 126 is fixed to housing 10 in position to encounter arm 80 and withstand the force developed in the system by this reversal of force in link 54.

The dimensions of the parts are such that with stop 112 adjusted as far as possible to the right and lever 88 shifted clockwise against stop 118, the implement will run at the maximum desired depth when controlled by the disclosed apparatus. However, if lever 88 is sprung away from quadrant 108 a slight amount, it can be shifted beyond stop 118 against hub 114, whereupon the automatic feature is disabled and rockshaft 18 is free to float or follow the natural up-and-down movement of links 46 and 48, cylinder 26 being continuously connected to conduit 38 so that piston 24 is free to move. In order to prevent extreme compression of spring 78 which would shift plunger 36 to neutral in spite of this extreme adjustment, a stop screw 128 is threaded into lever 58 and adjusted to contact the face of housing 10, before arm 80 can move far enough to neutralize plunger 36 with this setting. Thus, an ordinary plow can be connected to links 46, 48, and 54 and allowed to find its depth and maintain such depth independently of automatic operation, if desirable.

Under some conditions, an implement may be ill adapted for such automatic control, and for this situation another stop screw 130, FIG. 2, is engaged in lever 58 and may be threaded into contact with housing 10, when desired, to stop all rocking movement of shaft 62. This will immobilize the automatic system and prevent spring 78 from receiving any impulse or signals from link 54. Pivot point 82 then becomes stationary, and the device responds to the movements of lever 88 as a power assist arrangement to adjust the position of arms 42 and 50, and therefore of the attached implement. It therefore becomes a strictly "position control" arrangement, as opposed to the "draft control" system, which it is with screw 130 backed off clear of housing 10.

The operation of the device is thought to be clear from the foregoing description, and what is claimed as new and desired to be secured by Letters Patent of the United States is:

1. In a tractor of the type adapted to carry and propel an earth working implement and including a source of pressure fluid, a fluid motor and lift means connected to the implement and to the fluid motor adapted to raise and lower the implement in response to activation of the fluid motor, the combination of a
   shiftable element,
   sensing means connected to the implement, yieldable in response to variations in draft reactions from the implement,
   initiating means connected to said shiftable element and to said sensing means for shifting said shiftable element in response to yielding of said sensing means,
   follow-up means connected with said lift means and with said shiftable element at a point spaced from said initiating means,
   a hand lever pivotally mounted on and supported from said shiftable element, and
   detent means for retaining said hand lever in angular adjustment relative to said shiftable element,
   valve means on the tractor,
   conduit means connecting said valve means with said source of pressure fluid and with said fluid motor, and
   actuating means directly connected with said hand lever at a point
   between said initiating means and said follow-up means, and said actuating means being also directly connected with said valve in actuating relation therewith.

2. In a tractor of the type adapted to carry and propel an earth working implement and including a source of pressure fluid, a fluid motor and lift means connected to the implement and to the fluid motor adapted to raise and lower the implement in response to activation of the fluid motor, the combination of a
   shiftable element,
   sensing means connected to the implement, yieldable in response to variations in draft reactions from the implement,
   initiating means connected to said shiftable element and to said sensing means for shifting said shiftable element in response to yielding of said sensing means,
   follow-up means connected with said lift means and with said shiftable element at a point spaced from said initiating means,
   a hand lever pivotally mounted on and supported from said shiftable element,
   detent means engaged with said shiftable element and with said hand lever for retaining the latter in angular adjustment relative to said shiftable element,
   valve means on the tractor,
   conduit means connecting said valve means with said source of pressure fluid and with said fluid motor, and
   actuating means directly connected with said hand lever at a point
   spaced from said initiating means and from said follow-up means, and said actuating means being also directly connected with said valve in actuating relation therewith.

3. In a tractor of the type adapted to carry and propel an earth working implement and including a source of pressure fluid, a fluid motor and lift means connected to the implement and to the fluid motor adapted to raise and lower the implement in response to activation of the fluid motor, the combination of a
   shiftable element,
   sensing means connected to the implement, yieldable in response to variations in draft reactions from the implement,
   initiating means connected to said shiftable element and to said sensing means for shifting said shiftable element in response to yielding of said sensing means,
   a manually adjustable lever pivotally mounted on and supported from said shiftable element, and
   detent means for retaining said hand lever in angular adjustment relative to said shiftable element,
   valve means on the tractor,
   conduit means connecting said valve means with said source of pressure fluid and with said fluid motor,
   actuating means directly connected with said manually adjustable lever at a point spaced from said initiating means along the length of said shiftable element and with said valve in actuating relation therewith, such that yielding of said sensing means in the direction caused by excessive draft will actuate said valve means in the direction to cause raising of said implement by said fluid motor,
   follow-up means connected with said lift means and with said shiftable element at a point spaced from said initiating means, such that movement of said lift means in the direction to cause raising of said implement will actuate said valve means in the direction to stop raising movement of said implement and to tend to cause lowering of said implement.

4. In a tractor of the type adapted to carry and propel an earth working implement and including a source of pressure fluid, a fluid motor and lift means connected to the implement and to the fluid motor adapted to raise and lower the implement in response to activation of the fluid motor, the combination of
   sensing means yieldable in response to draft reactions in the implement, including
   downwardly directed lever arm means supported so as to swing by reason of yielding of said sensing means, said lever arm having a pivotal connection at its free end,
   upwardly directed shiftable means supported at one end on said pivotal connection, to change its position by reason of swinging of said lever arm,
   a rockshaft on the tractor constituting part of said lift means, to be rocked by said fluid motor in response to movements of said shiftable means,
   follow-up means connected with said rockshaft and with said shiftable means at a point
   spaced from said pivotal connection whereby to shift said shiftable means independently of said downwardly directed lever arm, in response to rocking of said rockshaft,
   valve means on the tractor,
   means connecting said valve means in controlling relation to said fluid motor,
   a manually adjustable lever pivotally mounted on and supported from said upwardly directed shiftable means,
   detent means engaged with said manually adjustable lever and with said upwardly directed shiftable means, for holding said lever in desired angular adjustment relative to said shiftable means,
   actuating means connected directly with said valve means and directly with said manually adjustable lever at a point spaced from said pivotal connection and from said follow-up means.

(References on following page)

References Cited by the Examiner

UNITED STATES PATENTS

| | | | |
|---|---|---|---|
| 2,721,508 | 10/55 | Edman | 172—10 |
| 2,764,923 | 10/56 | Morgen | 172—9 |
| 2,864,295 | 12/58 | Du Shane | 172—9 |
| 2,940,530 | 6/60 | Du Shane | 172—7 |
| 2,946,392 | 7/60 | Nelson | 172—7 |
| 2,968,353 | 1/61 | Edman | 172—7 |
| 2,974,733 | 3/61 | Fletcher | 172—7 |
| 3,083,777 | 4/63 | Maughan | 172—9 |
| 3,096,830 | 7/63 | Criswell et al. | 172—9 |

FOREIGN PATENTS

| | | |
|---|---|---|
| 1,134,610 | 12/56 | France. |
| 1,082,442 | 5/60 | Germany. |

ABRAHAM G. STONE, *Primary Examiner*.